(12) United States Patent
Watanabe

(10) Patent No.: US 12,339,262 B2
(45) Date of Patent: Jun. 24, 2025

(54) ANALYSIS ASSISTANCE DEVICE, METHOD, AND PROGRAM FOR SEARCHING FOR AN ANALYSIS CONDITION FOR USE WITH A LIQUID CHROMATOGRAPHY SYSTEM

(71) Applicant: SHIMADZU CORPORATION, Kyoto (JP)

(72) Inventor: Satoru Watanabe, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 113 days.

(21) Appl. No.: 17/230,723

(22) Filed: Apr. 14, 2021

(65) Prior Publication Data
US 2021/0341441 A1 Nov. 4, 2021

(30) Foreign Application Priority Data
Apr. 30, 2020 (JP) ................................. 2020-080822

(51) Int. Cl.
*G01N 30/86* (2006.01)
*G01N 30/02* (2006.01)
*G01N 30/88* (2006.01)

(52) U.S. Cl.
CPC ..... *G01N 30/8658* (2013.01); *G01N 30/8675* (2013.01); *G01N 2030/027* (2013.01); *G01N 2030/889* (2013.01)

(58) Field of Classification Search
CPC ................. G01N 30/8658; G01N 30/8675
See application file for complete search history.

(56) References Cited

U.S. PATENT DOCUMENTS

| 5,209,853 A | 5/1993 | Ynch et al. |
| 8,515,685 B2 | 8/2013 | Denny et al. |

(Continued)

FOREIGN PATENT DOCUMENTS

| CA | 2646508 A1 * | 9/2007 | ........... A61K 39/395 |
| CN | 101695480 A | 4/2010 | |

(Continued)

OTHER PUBLICATIONS

Gerdtsson, Erik, and et al. "Multiplex protein detection on circulating tumor cells from liquid biopsies using imaging mass cytometry." Convergent science physical oncology 4, No. 1 (2018): 015002 (Year: 2018).*

(Continued)

*Primary Examiner* — Douglas Kay
(74) *Attorney, Agent, or Firm* — Renner, Otto, Boisselle & Sklar, LLP

(57) ABSTRACT

An analysis assistance device includes an estimator that estimates distribution of measurement quality index data using a plurality of analysis condition data to be provided to an analysis device and a plurality of measurement data obtained in the analysis device based on the plurality of analysis condition data, and a measurement quality index outputter that outputs for display a region where the measurement quality index data is not less than a predetermined threshold value as a design space, and the measurement quality index outputter outputs the region of the design space in an enlarged manner by cutting off at least part of a region other than the design space in a distribution region of the measurement quality index data.

5 Claims, 8 Drawing Sheets

(56) References Cited

U.S. PATENT DOCUMENTS

| | | | |
|---|---|---|---|
| 11,244,818 | B2 | 2/2022 | Abramovitch |
| 2010/0013757 | A1* | 1/2010 | Ogikubo ............... H04N 19/59 |
| | | | 345/156 |
| 2013/0123126 | A1 | 5/2013 | Collins et al. |
| 2013/0275439 | A1 | 10/2013 | Minvielle |
| 2014/0156612 | A1 | 6/2014 | Bondarenko |
| 2014/0236497 | A1 | 8/2014 | Escher et al. |
| 2015/0055844 | A1* | 2/2015 | Molin ................. G06T 3/4053 |
| | | | 382/131 |
| 2015/0253293 | A1 | 9/2015 | Ohashi |
| 2016/0180555 | A1 | 6/2016 | Matsuo |
| 2017/0322190 | A1 | 11/2017 | Nyholm et al. |
| 2019/0086374 | A1 | 3/2019 | Ito et al. |
| 2019/0092835 | A1 | 3/2019 | Leister et al. |
| 2019/0369069 | A1 | 12/2019 | Ota |
| 2020/0064193 | A1 | 2/2020 | Chono et al. |
| 2020/0110064 | A1 | 4/2020 | Sugimoto |
| 2021/0009964 | A1 | 1/2021 | Khatwani et al. |
| 2021/0048414 | A1 | 2/2021 | Gardinier et al. |
| 2021/0327564 | A1* | 10/2021 | Ferreira ................ G16H 30/20 |
| 2021/0405002 | A1* | 12/2021 | Noda ................ G01N 30/8658 |

FOREIGN PATENT DOCUMENTS

| | | | |
|---|---|---|---|
| CN | 107110835 | A | 8/2017 |
| EP | 2270491 | A | 1/2011 |
| JP | 02-300660 | A | 12/1990 |
| JP | 05-322869 | A | 12/1993 |
| JP | H06-324029 | A | 11/1994 |
| JP | H07-151743 | A | 6/1995 |
| JP | H09-318613 | A | 12/1997 |
| JP | 2004-053283 | A | 2/2004 |
| JP | 2012-163476 | A | 8/2012 |
| JP | 2014-098672 | A | 5/2014 |
| JP | 2015-166726 | A | 9/2015 |
| JP | 2017-534060 | A | 11/2017 |
| JP | 2020-183931 | A | 11/2020 |
| WO | 2020/020152 | A1 | 1/2020 |

OTHER PUBLICATIONS

Wanner, Adrian A., and et al. "Dense EM-based reconstruction of the interglomerular projectome in the zebrafish olfactory bulb." Nature neuroscience 19, No. 6 (2016): 816-825 (Year: 2016).*

Beens, Jan, and et al. "Quantitative aspects of comprehensive two-dimensional gas chromatography (GC×GC)." Journal of High Resolution Chromatography 21, No. 1 (1998): 47-54 (Year: 1998).*

Office Action in the Chinese patent application 202110380504.0, and English machine translation thereof, dated Nov. 24, 2022.

Publication "Study to Determine Sudan Red Component in Hot Pepper Products by High Performance Liquid Chromatography" by Kanan Chemicals; vol. 27, No. 11; pp. 33-37, and English machine translation thereof, dated Nov. 30, 2010.

Office Action for commonly owned-copending U.S. Appl. No. 17/230,745 dated Oct. 10, 2022.

Commonly Owned-Copending U.S. Appl. No. 17/230,698, filed Apr. 14, 2021.

Commonly Owned-Copending U.S. Appl. No. 17/230,745, filed Apr. 14, 2021.

Office Action for commonly owned-copending U.S. Appl. No. 17/230,698 dated Aug. 9, 2022.

Notice of Reasons for Refusal in related JP Patent Application No. 2020-084060 dated Jul. 11, 2023, with English machine translation.

Office Action in corresponding Chinese Patent Application No. 202110493186.9 dated Jul. 27, 2023, with English machine translation.

Office Action dated Jun. 16, 2023 for corresponding Chinese Application No. 202110380504.0 (English machine translation).

Notice of Reasons for Refusal dated Jul. 4, 2023 for corresponding Japanese Patent Application (2020-077306) (English machine translation).

Notice of Allowance dated Jul. 6, 2023 for corresponding U.S. Appl. No. 17/230,698.

Office Action for commonly owned-copending U.S. Appl. No. 17/230,745 dated May 3, 2023.

Office Action in corresponding Chinese Patent Application No. 202110380504.0 dated Sep. 7, 2023, with English machine translation.

Office Action in copending U.S. Appl. No. 17/230,745 dated Dec. 29, 2023.

Office Action in corresponding Chinese Patent Application No. 202110439368.8 dated Sep. 1, 2023, with English machine translation.

Decision on Rejection in corresponding Chinese Patent Application No. 202110493186.9 dated Apr. 9, 2024, with English machine translation.

Wang Zhengfan; "Chromatographic Qualification and Quantification"; Chemical Industry Press; pp. 267-269; Mar. 31, 2000, with English machine translation thereof.

Office Action in co-pending U.S. Appl. No. 17/230,745 dated Jun. 7, 2024.

Wang, et al.; Chromatographic Qualification and Quantification; Chemical Industry Press; 2000; pp. 1-11.

Office Action in corresponding Chinese Patent Application No. 202110380504.0 dated Nov. 23, 2023, with English machine translation.

Office Action in co-pending Chinese Patent Application No. 202110380504.0 dated Nov. 23, 2023, with English machine translation.

Decision on Rejection in corresponding Chinese Patent Application No. 202110380504.0 dated Apr. 13, 2024, with English machine translation.

Ma Liping et al.; "Applied regression analysis", pp. 2-3, Capital University of Economics and Business Press; published May 21, 2019; with English machine translation.

Ordnance Industry Science and Technology Dictionary Editorial Committee; "Ordnance Industry Science and Technology Dictionary (Part 1)", p. 172, National Defense Industry Press; published Feb. 28, 2998; with English machine translation.

Office Action in corresponding Chinese Patent Application No. 202110439368.8 dated Apr. 26, 2024, with English machine translation. (Application No. corrected-reference previously provided).

Office Action for commonly owned-copending U.S. Appl. No. 17/230,745 dated Feb. 4, 2025.

Office Action for corresponding U.S. Appl. No. 17/230,698 dated Mar. 3, 2023.

* cited by examiner

ANALYSIS ASSISTANCE DEVICE, METHOD, AND PROGRAM FOR SEARCHING FOR AN ANALYSIS CONDITION FOR USE WITH A LIQUID CHROMATOGRAPHY SYSTEM

BACKGROUND

Technical Field

The present invention relates to an analysis assistance device, an analysis assistance method, and a non-transitory computer readable storage medium recording an analysis assistance program.

Description of Related Art

An analysis device that analyzes components of a sample is provided. An analysis result of the sample is varied depending on analysis conditions set in the analysis device and, therefore, method scouting for searching for an optimal analysis condition is performed.

JP 2015-166726 A discloses a chromatograph data processor. The data processor of JP 2015-166726 A can assist a method scouting work by presenting an unexamined analysis condition to a user.

Also, there is a technique that can estimate distribution of a measurement quality index by performing a regression analysis between an analysis condition and the measurement quality index. Then, the technique can assist the method scouting work by presenting to the user a range in which the measurement quality index exceeds a threshold value in the distribution of the measurement quality index as a design space.

SUMMARY

With the data processor disclosed in JP 2015-166726 A, the user can identify the unexamined analysis condition. Also, the user can identify a relationship between the analysis condition and the measurement quality index by reference to the design space. Furthermore, if various information for optimizing the analysis condition can be provided, it is useful for the user who uses an analysis device.

An object of the present invention is to provide a user with information useful for optimizing an analysis condition in an analysis device.

An analysis assistance device according to one aspect of the present invention includes an estimator that estimates distribution of measurement quality index data using a plurality of analysis condition data to be provided to an analysis device and a plurality of measurement data obtained in the analysis device based on the plurality of analysis condition data, and a measurement quality index outputter that outputs for display a region where the measurement quality index data is not less than a predetermined threshold value as a design space, and the measurement quality index outputter outputs the region of the design space in an enlarged manner by cutting off at least part of a region other than the design space in a distribution region of the measurement quality index data.

Other features, elements, characteristics, and advantages of the present disclosure will become more apparent from the following description of preferred embodiments of the present disclosure with reference to the attached drawings.

DETAILED DESCRIPTION

Configurations of an analysis assistance device, an analysis assistance method, and an analysis assistance program according to an embodiment of the present invention will be described below with reference to the attached drawing.

(1) Overall Configuration of Analysis System

Figure 1:
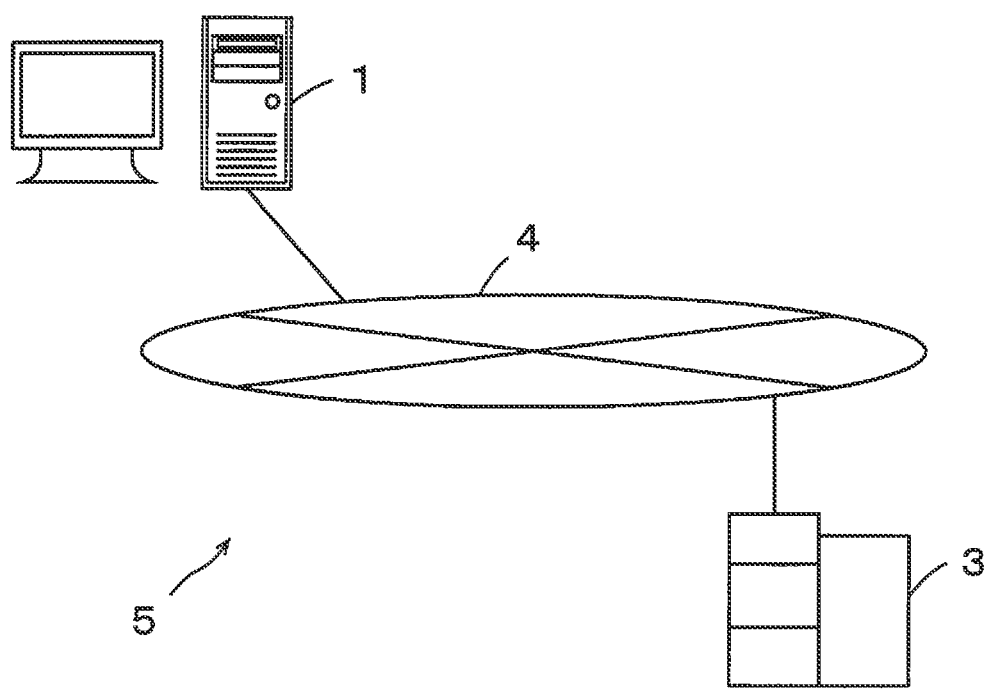
FIG. 1 is an overall view of an analysis system according to the present embodiment.

FIG. 1 is an overall diagram of an analysis system 5 according to the embodiment of the present invention. The analysis system 5 includes a computer 1 and a liquid chromatograph 3. The computer 1 and the liquid chromatograph 3 are connected to each other via a network 4. The network 4 is, for example, a LAN (Local Area Network).

The computer 1 includes a function of setting analysis conditions in the liquid chromatograph 3, a function of acquiring measurement results in the liquid chromatograph 3 and analyzing the acquired measurement results, etc. A program for controlling the liquid chromatograph 3 is installed in the computer 1.

The liquid chromatograph 3 includes a pump unit, an autosampler unit, a column oven unit, a detector unit, etc. The liquid chromatograph 3 includes also a system controller. The system controller controls the liquid chromatograph 3 in accordance with a control instruction received via the network 4 from the computer 1. The system controller transmits data of the measurement results of the liquid chromatograph 3 to the computer 1 via the network 4.

(2) Configuration of Computer (Analysis Assistance Device)

Figure 2:
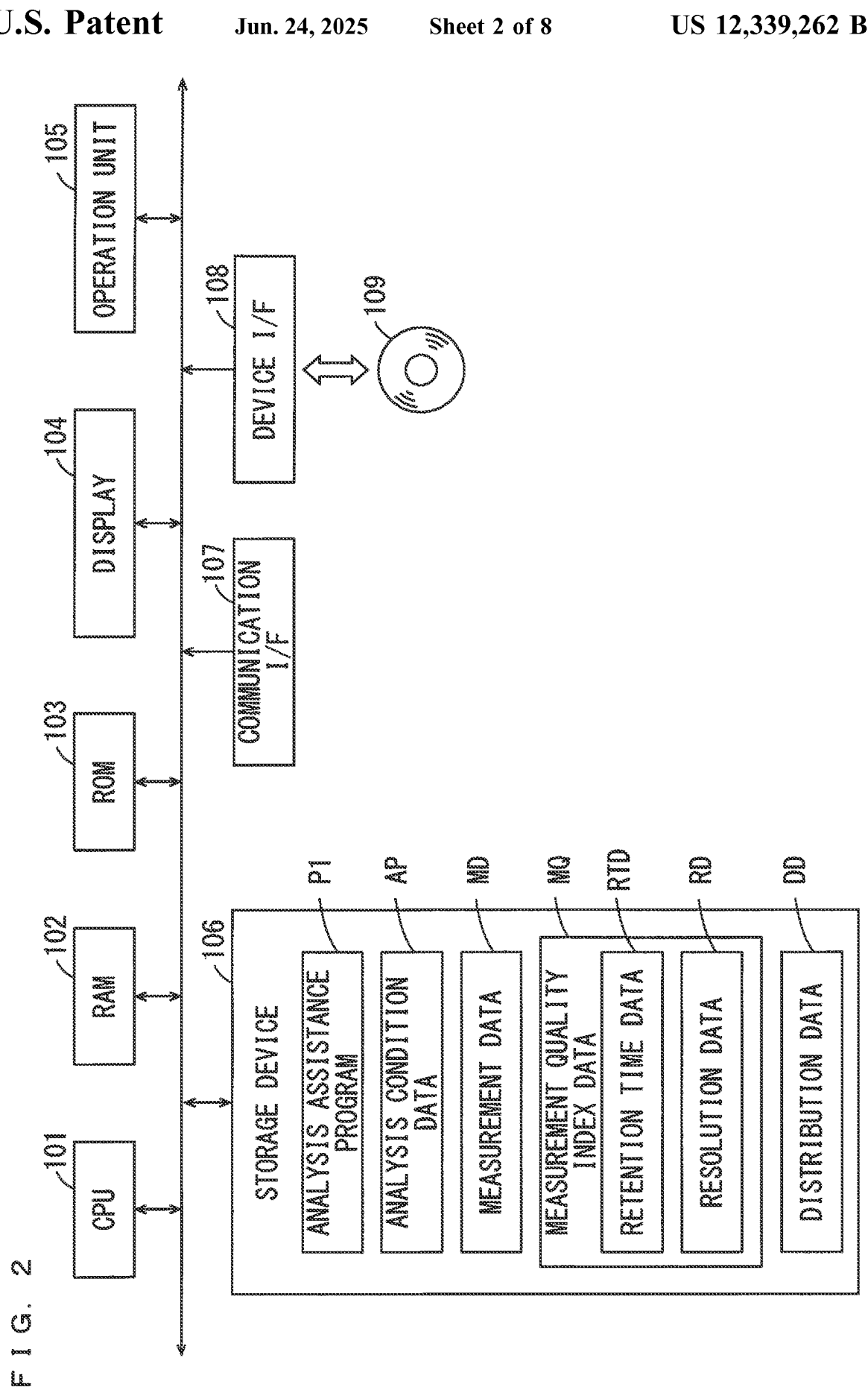
FIG. 2 is a configuration diagram of a computer according to the present embodiment.

FIG. 2 is a configuration diagram of the computer 1. A personal computer is utilized as the computer 1 in the present embodiment. The computer 1 includes a CPU (Central Processing Unit) 101, a RAM (Random Access Memory) 102, a ROM (Read Only Memory) 103, a display 104, an operation unit 105, a storage device 106, a communication interface 107, and a device interface 108.

The CPU 101 performs control of the computer 1. The RAM 102 is used as a work area when the CPU 101 executes a program. The ROM 103 stores a control program, etc. The display 104 is, for example, a liquid crystal display. The operation unit 105 is a device that accepts a user's operation and includes a keyboard, a mouse, etc. The display 104 may be constituted by a touch panel display and may include a function as the operation unit 105. The storage device 106 is a device that stores various programs and data. The storage device 106 is, for example, a hard disk. The communication interface 107 is an interface that communicates with another computer and another device. The communication interface 107 is connected to the network 4. The device interface 108 is an interface that accesses various external devices. The CPU 101 can access a storage medium 109 through the external devices connected to the device interface 108.

The storage device 106 stores an analysis assistance program P1, analysis condition data AP, measurement data MD, measurement quality index data MQ, and distribution data DD. The analysis assistance program P1 is a program for controlling the liquid chromatograph 3. The analysis assistance program P1 includes a function of setting an analysis condition for the liquid chromatograph 3, a function of acquiring a measurement result from the liquid chromatograph 3 and analyzing the measurement result, etc. The analysis condition data AP is data that describes the analysis condition to be set in the liquid chromatograph 3 and includes a plurality of analysis parameters. The measurement data MD is data of the measurement result acquired from the liquid chromatograph 3. The measurement quality index data MQ is data for evaluating quality of the measurement result acquired from the liquid chromatograph 3. The measurement quality index data MQ includes retention time data RTD and resolution data RD. The distribution data DD is data indicating distribution of measurement quality index data MQ estimated based on analysis condition data AP actually set in the liquid chromatograph 3 and measurement data MD actually measured in the liquid chromatograph 3. The distribution data DD indicates a response surface of the measurement quality index data MQ. The distribution and the response surface of the measurement quality index data MQ will be described in detail later.

Figure 3:
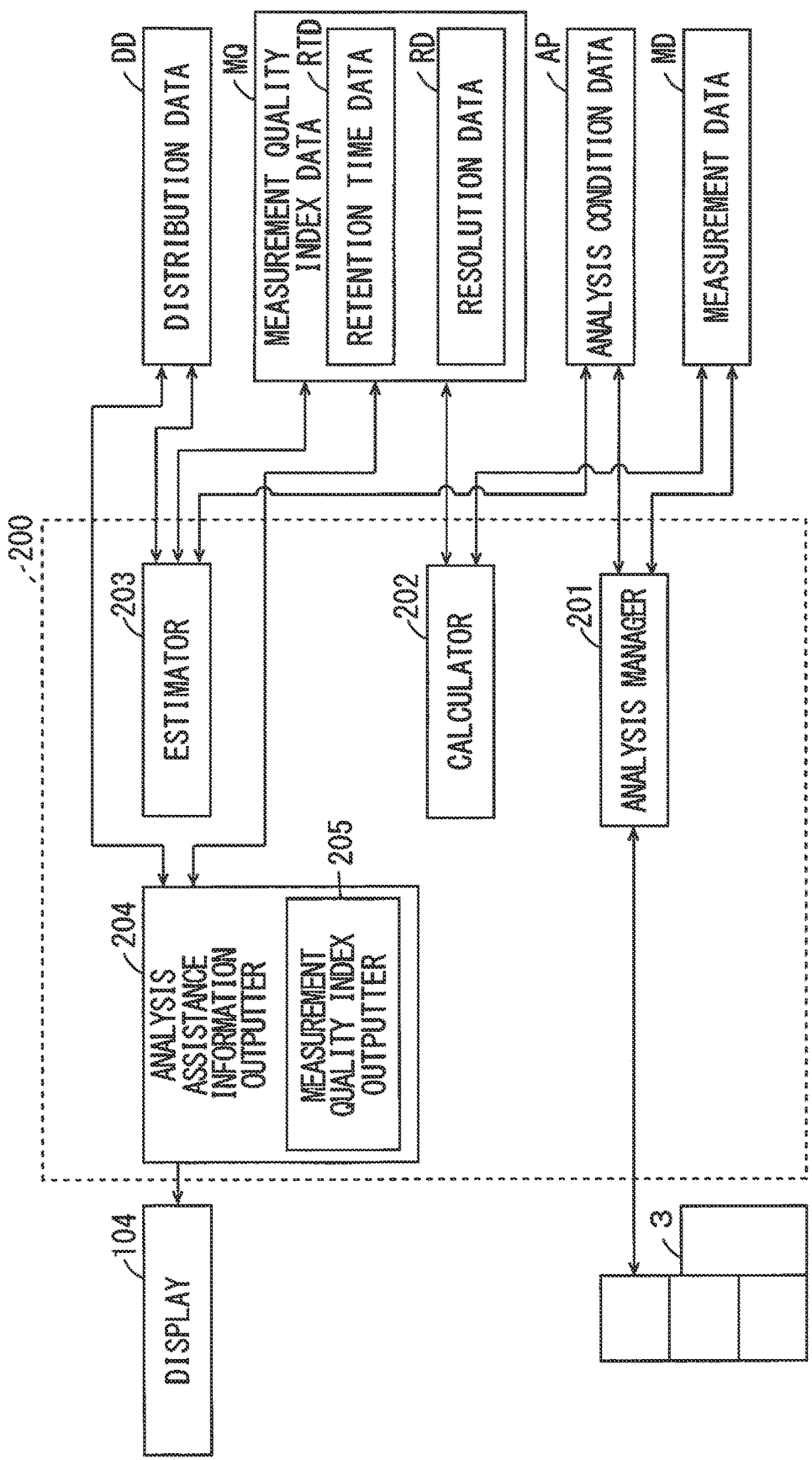
FIG. 3 is a functional block diagram of the computer according to the present embodiment.

FIG. 3 is a functional block diagram of the computer 1. A controller 200 is a functional unit that is implemented by the CPU 101 using the RAM 102 as a work area to execute the analysis assistance program P1. The controller 200 includes an analysis manager 201, a calculator 202, an estimator 203, and an analysis assistance information outputter 204.

The analysis manager 201 controls the liquid chromatograph 3. The analysis manager 201 instructs the liquid chromatograph 3 to perform analysis processing in response to the user's instruction to set analysis condition data AP and start the analysis processing. The analysis manager 201 also acquires measurement data MD from the liquid chromatograph 3.

The calculator 202 calculates measurement quality index data MQ based on measurement data MD indicating a measurement result in the liquid chromatograph 3. The calculator 202 calculates retention time data RTD and resolution data RD as the measurement quality index data MQ.

The estimator 203 estimates distribution data DD indicating distribution of measurement quality index data MQ based on analysis condition data AP used for actual measurement and measurement quality index data MQ actually calculated based on that analysis condition data AP. That is, the distribution data DD includes an estimated value of the measurement quality index data MQ for analysis condition data AP that is not actually used for measurement. The estimator 203 performs a regression analysis for estimating the distribution data DD.

The analysis assistance information outputter 204 performs output of information for analysis assistance to the display 104 using the analysis condition data AP, the measurement quality index data MQ estimated in the estimator 203, the distribution data DD, etc. The analysis assistance information outputter 204 includes a measurement quality index outputter 205.

(3) Measurement Quality Index and Design Space

Figure 4:
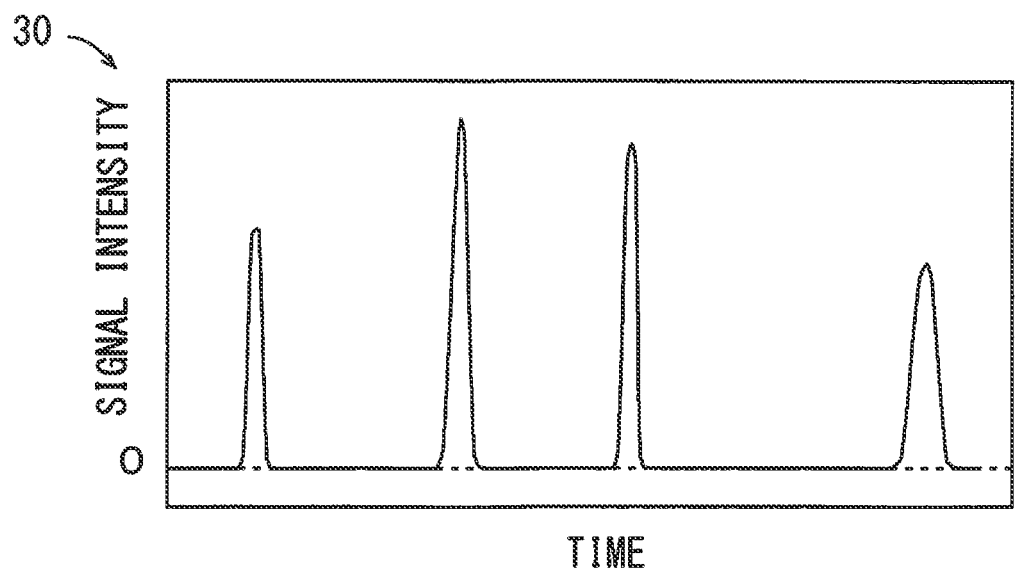
FIG. 4 is a diagram showing a chromatogram obtained in a liquid chromatograph.

A measurement quality index and a design space will be described below with reference to FIGS. 4 to 6. FIG. 4 is a diagram showing a chromatogram 30 obtained in the liquid chromatograph 3. In a separation column included in the liquid chromatograph 3, components contained in a sample are separated. The separated components are detected by a detector included in the liquid chromatograph 3. The detector detects an absorption spectrum, a refractive index, light scattering or the like of each component separated in the separation column. The chromatogram 30 shown in FIG. 4 indicates signal intensity of the absorption spectrum or the like of each component detected by the detector of the liquid chromatograph 3.

Figure 5:
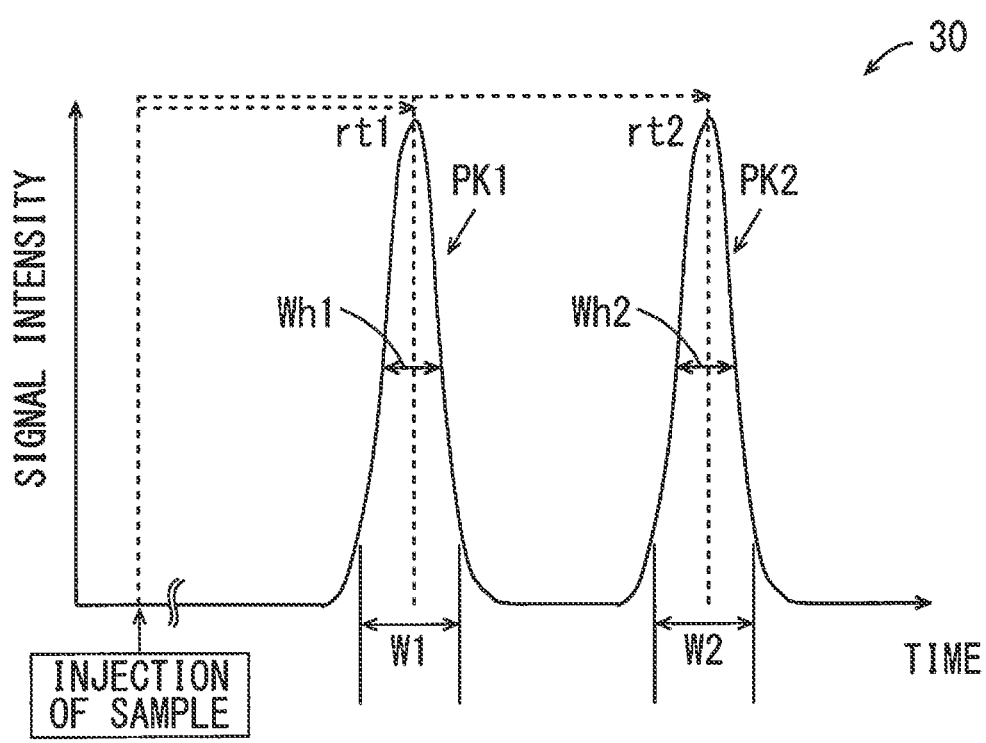
FIG. 5 is a diagram showing peaks in the chromatogram.

FIG. 5 is a diagram showing two peaks PK1, PK2 in the chromatogram 30. Retention times of the peaks PK1, PK2 are rt1, rt2, respectively. Peak widths of the peaks PK1, PK2 are W1, W2, respectively. Half widths (full widths at half maximum) of the peaks PK1, PK2 are Wh1, Wh2, respectively. Resolution R of the peaks PK1, PK2 is expressed by the flowing equation (1) or (2), for example.

$$R=2\times(rt2-rt1)/(W1+W2) \quad (1)$$

$$R=1.18\times\{(rt2-rt1)/(Wh1+Wh2)\} \quad (2)$$

The above equations mean that adjacent peaks are separated at a farther distance from each other as the value of the resolution R becomes larger. When the resolution R is not less than 1.5 or not less than 2.0, the adjacent peaks are determined to be completely separated.

When the resolution R exceeds a predetermined threshold value (e.g. 2.0), it is considered that a measurement result in the liquid chromatograph 3 is valid. That is, the resolution R is one of measurement quality indexes in the liquid chromatograph 3. A plurality of peaks corresponding to a plurality of components appear in the chromatogram 30. A minimum resolution R among a plurality of resolutions R calculated from these plurality of peaks can be defined as a measurement quality index. Alternatively, the retention time rt1, rt2 is also one of the measurement quality indexes in the liquid chromatograph 3.

A plurality of measurement data MD can be obtained by actually providing the liquid chromatograph 3 with a plurality of analysis condition data AP. Resolution data RD corresponding to each analysis condition data AP can be calculated from the actually measured measurement data MD. Then, distribution of the resolution data RD can be obtained by a regression analysis from the plurality of analysis condition data AP and the plurality of resolution data RD obtained from the plurality of analysis condition data AP. That is, distribution of measurement quality index data MQ can be obtained from the plurality of analysis condition data AP and the plurality of resolution data RD.

More specifically, a regression equation between the actually used plurality of analysis condition data AP and the plurality of resolution data RD calculated from the actually measured measurement data MD is acquired. Then, by applying the regression equation to other analysis condition data AP that are not actually used, resolution data RD corresponding to these other analysis condition data AP are estimated. Thus, distribution of the resolution data RD as the measurement quality index is obtained. That is, the regression equation indicates the distribution of the resolution data RD as the measurement quality index. Alternatively, distribution of the retention time data RTD may be estimated by the regression analysis, and the resolution data RD may be calculated from the estimated retention time data RTD. Bayes estimation can be used in the regression analysis.

Figure 6:
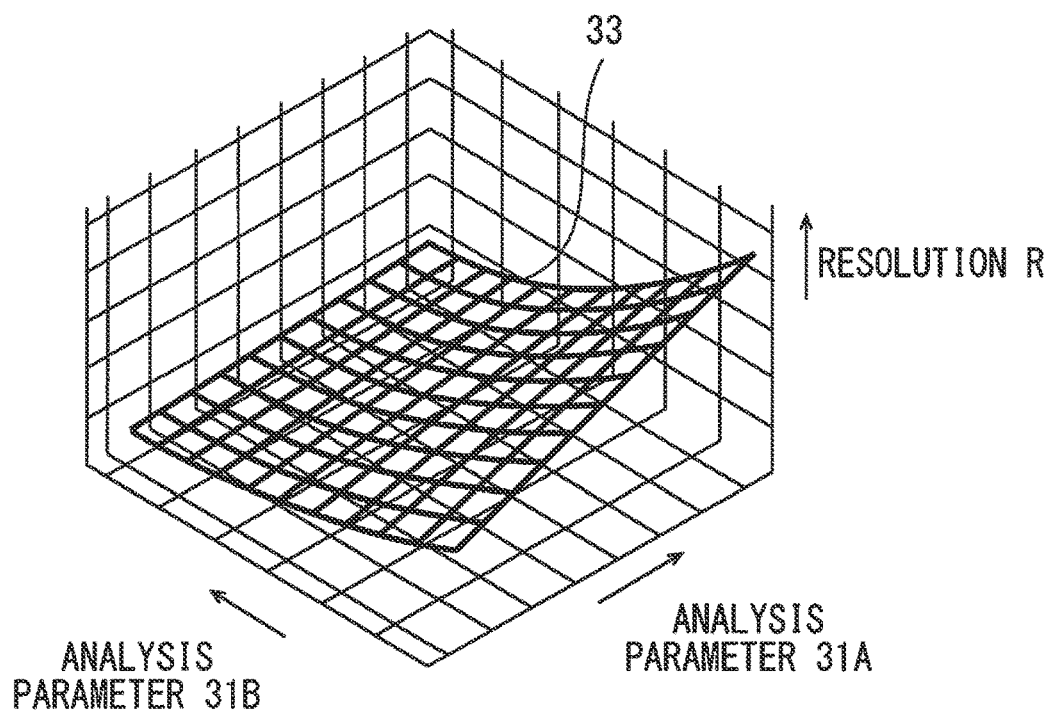
FIG. 6 is a diagram showing a response surface showing distribution of resolution.

FIG. 6 is a diagram showing one example of a response surface 33 which is the distribution of the resolution data RD. That is, FIG. 6 is a diagram showing the distribution of the resolution data RD as the measurement quality index. FIG. 6 depicts a response surface 33 indicating a change in resolution R relative to two types of analysis parameters 31A, 31B as the analysis condition. That is, if a combination of the analysis parameters 31A, 31B as the analysis condition is determined, resolution R corresponding to the determined combination is evaluated from the response surface 33.

Figure 7:
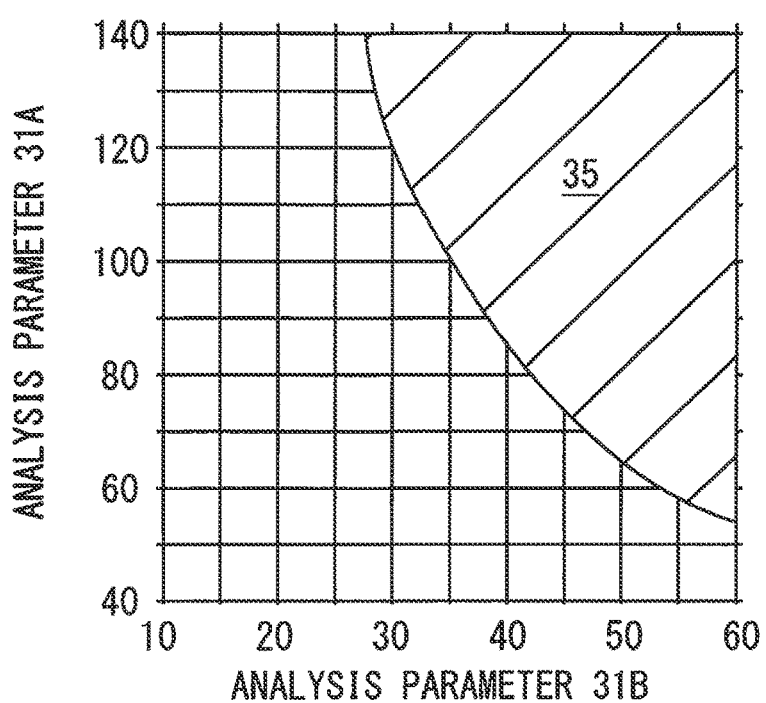
FIG. 7 is a diagram showing a design space relative to the distribution of resolution.

FIG. 7 is a diagram showing a design space relative to distribution of resolution R. In the response surface 33 shown in FIG. 6, a design space 35 being an allowable range of the resolution R is acquired by setting a threshold value of the resolution R as the measurement quality index. FIG. 7 depicts a region where the resolution R is not less than a threshold value (e.g., 2.0) as the design space 35 in the response surface 33 shown in FIG. 6. In FIG. 7, a hatched region is the design space 35. In the region of the design space 35, even if the analysis parameters 31A, 31B are changed, it is shown that the resolution R as the measurement quality index falls within the allowable range.

(4) Analysis Assistance Method

Figure 8:
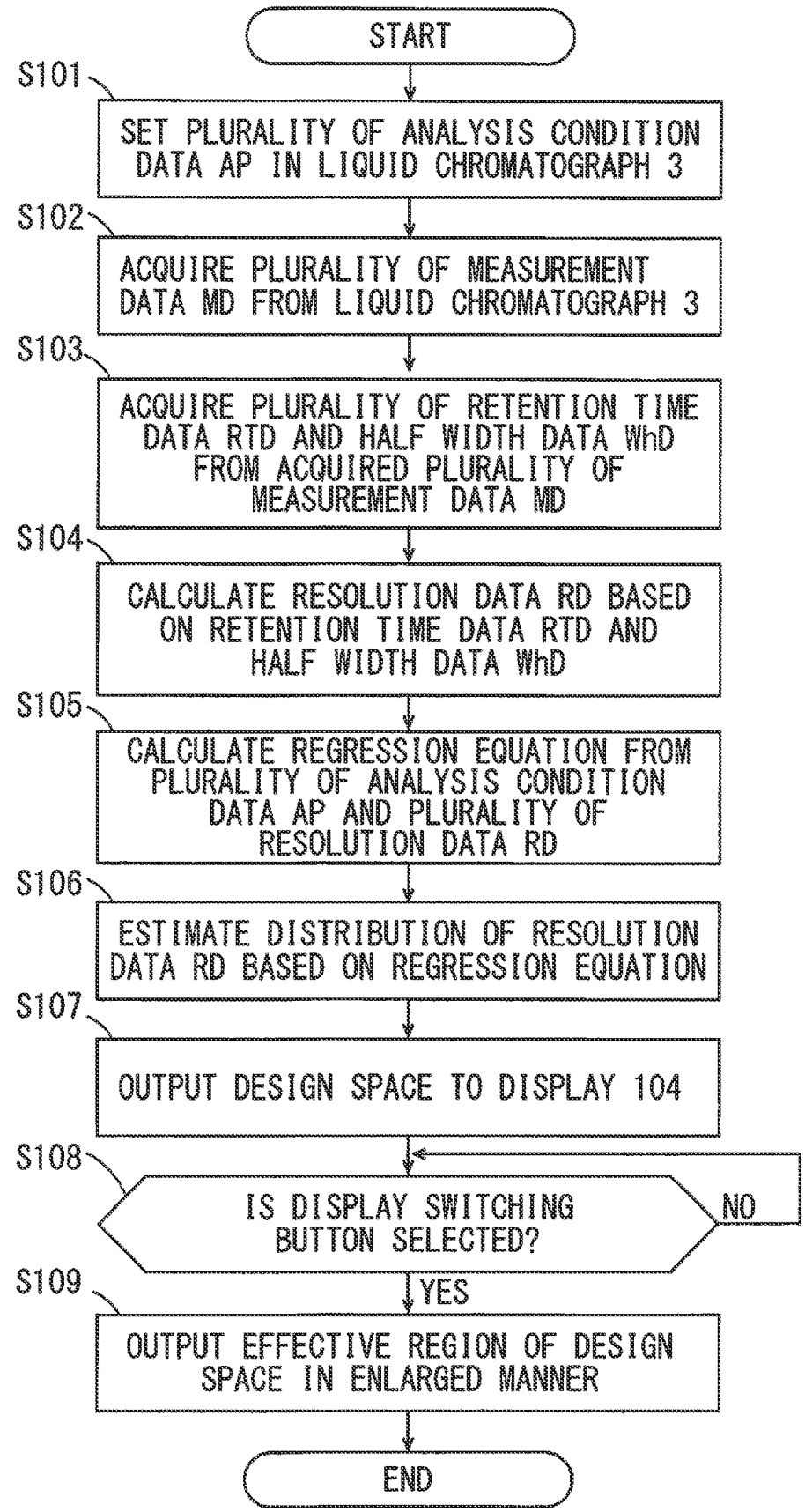
FIG. 8 is a flowchart showing an analysis assistance method according to the present embodiment.

An analysis assistance method executed in the computer 1 (analysis assistance device) according to the present embodiment will be described below. FIG. 8 is a flowchart showing the analysis assistance method according to the present embodiment. Before processing shown in FIG. 8 is started, a user operates the operation unit 105 in advance to set a plurality of analysis conditions. More specifically, the user sets combinations of set values of analysis parameters such as a solvent concentration, a solvent mixing ratio, a gradient initial value, a gradient condition, a column temperature as the analysis conditions. The user sets a plurality of sets of combinations of these analysis parameters. The user sets, as the analysis conditions, for example, combinations of the analysis parameters in which the solvent concentration is gradually changed, or combinations of the analysis parameters in which the column temperature is gradually changed. In response to such a setting operation by the user, the analysis manager 201 stores a plurality of analysis condition data AP in the storage device 106.

Then, in step S101 shown in FIG. 8, the analysis manager 201 sets the plurality of analysis condition data AP in the liquid chromatograph 3. More specifically, the analysis manager 201 sets the plurality of analysis condition data AP for a system controller of the liquid chromatograph 3. In response to this, analysis processing is executed plural times on a same sample based on the set plurality of analysis condition data AP. A plurality of measurement data MD corresponding to the plurality of analysis condition data AP are acquired in the liquid chromatograph 3. That is, a plurality of chromatograms corresponding to the plurality of analysis condition data AP are acquired in the liquid chromatograph 3.

Next, in step S102, the analysis manager 201 acquires the plurality of measurement data MD from the liquid chromatograph 3. The analysis manager 201 stores the acquired plurality of measurement data MD in the storage device 106.

Then, in step S103, the calculator 202 acquires the plurality of measurement data MD stored in the storage device 106 in step S102, and acquires a plurality of retention time data RTD and a plurality of half width data WhD from the acquired plurality of measurement data MD. Since the measurement data MD are chromatograms, each measurement data MD includes a plurality of peaks. Thus, the plurality of retention time data RTD and the plurality of half width data WhD corresponding to the plurality of peaks are acquired from each measurement data MD.

Then, in step S104, the calculator 202 calculates a plurality of resolution data RD using the plurality of retention time data RTD and the plurality of half width data WhD acquired in step 103. The calculator 202 calculates the resolution data RD based on the retention time data RTD and the half width data WhD by utilizing the above-mentioned equation (2). Note that while the half width data WhD is acquired and the resolution data RD is calculated by utilizing the equation (2) in the present embodiment, a peak width may be acquired and the resolution data RD may be calculated by utilizing the equation (1).

Then, in step S105, the estimator 203 performs a regression analysis based on the plurality of analysis condition data AP and the plurality of resolution data RD. Thus, the estimator 203 calculates a regression equation between the analysis conditions and the resolution. Subsequently, in step S106, the estimator 203 estimates distribution of the resolution data RD based on the regression equation. In the present embodiment, Bayes estimation is used when the regression analysis is performed. As another method, a least-square method can also be used as the regression analysis.

Since the aforementioned steps S101 to S106 performed by the analysis assistance program P1 are executed by the computer 1, resolution data RD is estimated also as to analysis conditions other than the actually executed analysis conditions. Thus, the estimator 203 creates distribution data DD using the resolution data RD as the measurement quality index. The estimator 203 stores the distribution data DD into the storage device 106.

Figure 9:
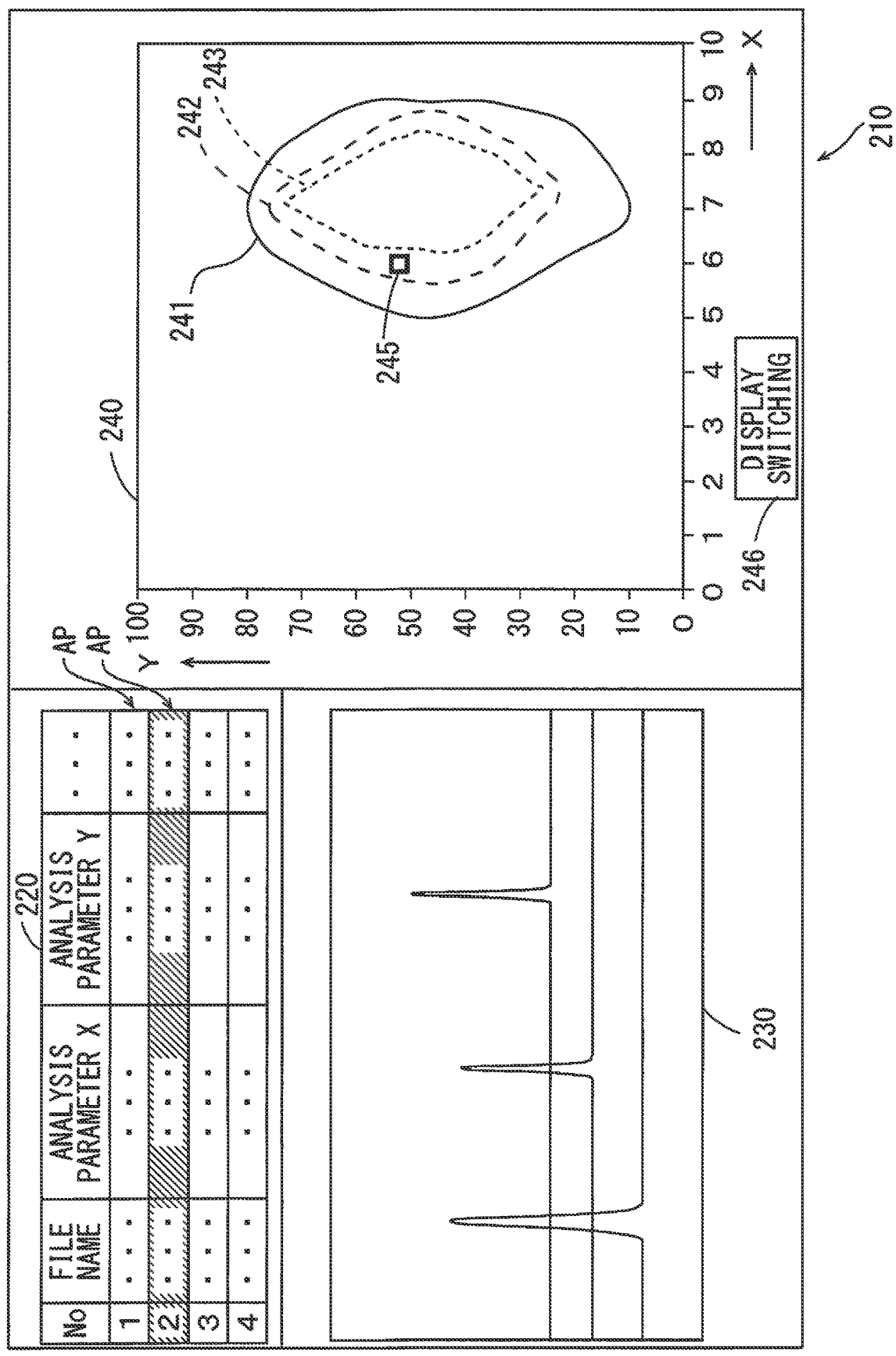
FIG. 9 is a diagram showing an analysis assistance screen displayed in a display.

Next, in step S107, the measurement quality index outputter 205 outputs a design space to the display 104. FIG. 9 is a diagram showing an analysis assistance screen 210 displayed on the display 104 by the analysis assistance information outputter 204. The analysis assistance screen 210 includes a method list display area 220, a chromatogram display area 230, and a measurement quality index display area 240. The measurement quality index display area 240 is an area in which the design space is displayed, and is displayed by the measurement quality index outputter 205.

The method list display area 220 displays a list of a plurality of analysis condition data AP. The analysis condition data AP in a row is constituted by a plurality of analysis parameters X, Y . . . .

The chromatogram display area 230 displays a chromatogram based on measurement data MD. The chromatogram displayed in the chromatogram display area 230 is a chromatogram corresponding to any one of the plurality of analysis condition data AP displayed in the method list display area 220. In an example shown in FIG. 9, analysis condition data AP of No. 2 is highlighted in the method list display area 220, and a chromatogram corresponding to the analysis condition data AP of No. 2 is displayed in the chromatogram display area 230.

The measurement quality index display area 240 is displayed by the measurement quality index outputter 205 as described above. Distribution of resolution data RD is displayed as a measurement quality index in the measurement quality index display area 240. The abscissa of the distribution represents the analysis parameter X, and the ordinate represents the analysis parameter Y. The distribution of the resolution data RD indicates a relationship between the two analysis parameters X, Y and the resolution data RD.

Also, a solid line 241 in FIG. 9 represents an effective region where the resolution data RD is not less than a threshold value of 2.0 at 50 percentile. A broken line 242 in FIG. 9 represents an effective region where the resolution data RD is not less than the threshold value of 2.0 at 80 percentile. A broken line 243 in FIG. 9 represents an effective region where the resolution data RD is not less than the threshold value of 2.0 at 90 percentile. In the present embodiment, the resolution data RD displayed in the measurement quality index display area 240 is calculated by Bayes estimation and therefore has probability distribution. Thus, a design space is depicted where the resolution data RD is not less than the threshold value of 2.0 for each percentile.

Also, an analysis condition pointer 245 is indicated in the measurement quality index display area 240. This represents a point of currently selected analysis condition data AP. A chromatogram corresponding to the analysis condition data AP designated by the analysis condition pointer 245 is displayed in the chromatogram display area 230. That is, the analysis condition data AP highlighted in the method list display area 220 coincides with the analysis condition data AP designated by the analysis condition pointer 245 in the measurement quality index display area 240. A position selected in the method list display area 220 and a position designated by the analysis condition pointer 245 are in conjunction with each other, and the states of the both positions are changed by performing either the selecting operation or the designating operation.

Figure 10:
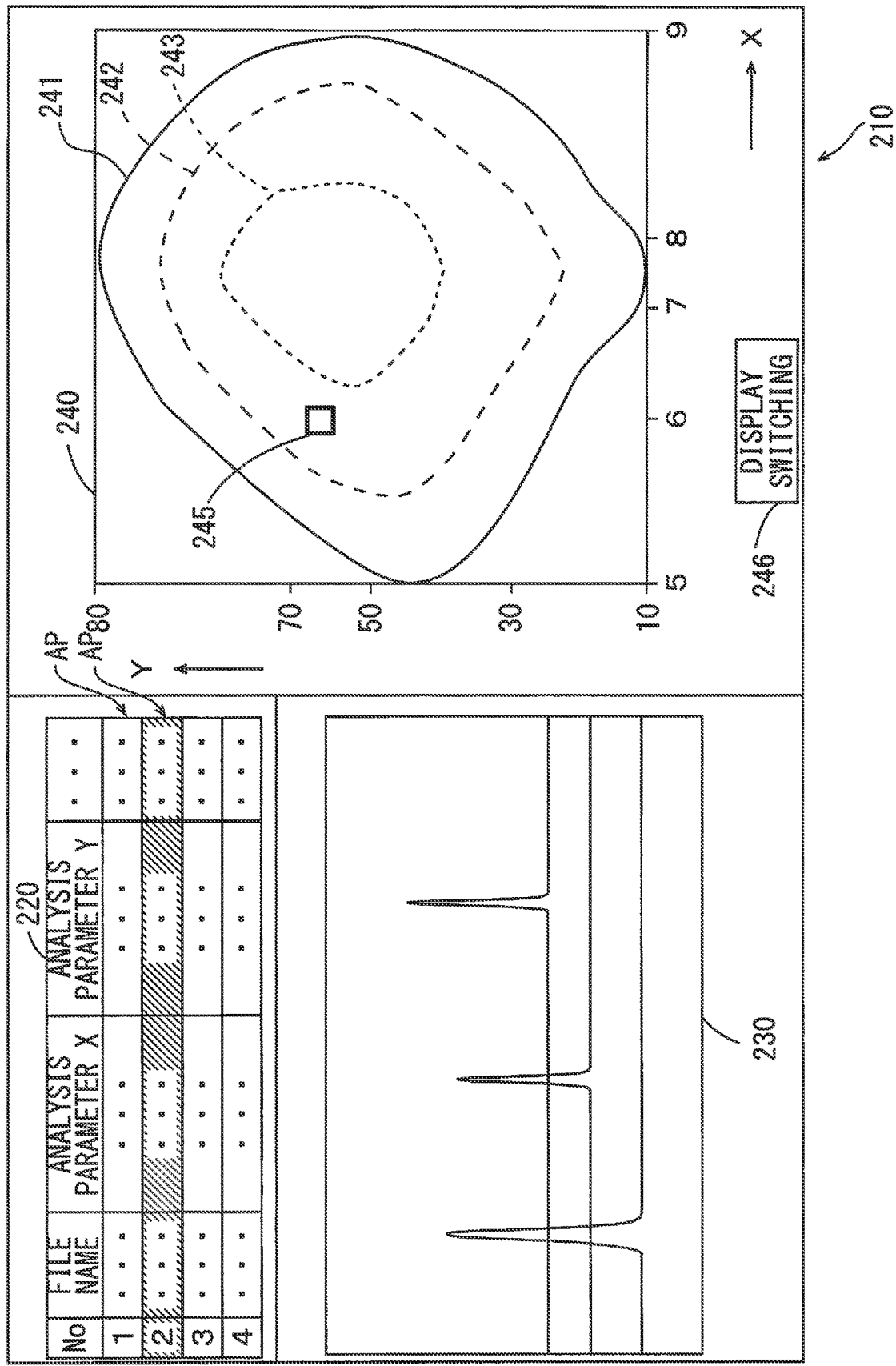
FIG. 10 is a diagram showing the analysis assistance screen displayed in the display.

A display switching button 246 is provided in the measurement quality index display area 240. The display switching button 246 is a button used for displaying in an enlarged manner the effective region of the design space displayed in the measurement quality index display area 240. When the user performs a selecting operation of the display switching button 246, the measurement quality index outputter 205 outputs the effective region of the design space in an enlarged manner. FIG. 10 is a diagram showing the analysis assistance screen 210 on which the effective region of the design space is displayed in an enlarged manner.

In the measurement quality index display area 240 shown in FIG. 9, distribution with respect to resolution data RD is displayed in a region where the parameter X is in a range of 0 to 10 and the parameter Y is in a range of 0 to 100. Also, in the measurement quality index display area 240 shown in FIG. 9, the region where the design space is displayed is around a range of 5 to 9 for the parameter X and around a range of 10 to 80 for the parameter Y. In the measurement quality index display area 240 shown in FIG. 10, distribution with respect to resolution data RD is displayed in a region where the parameter X is in a range of 5 to 9 and the parameter Y is in a range of 10 to 80. That is, in the measurement quality index display area 240 shown in FIG. 10, a range in which the parameter X is 1 to 4 and a range in which the parameter X is 9 to 10 are cut off, and a range in which the parameter Y is 0 to 10 and a range in which the parameter Y is 80 to 100 are cut off, whereby an effective region where the design space is present is displayed in the enlarged manner in FIG. 10.

In this way, in the analysis assistance method of the present embodiment, the measurement quality index outputter 205 outputs the effective region of the design space in the enlarged manner in the measurement quality index display area 240. While all of the regions other than the region where the design space is present are cut off with respect to axial directions of the parameter X and the parameter Y in the example shown in FIG. 10, this is one example. The measurement quality index outputter 205 can output the design space as the effective region in the enlarged manner by cutting off at least part of the region other than the region where the design space is present with respect to the axial directions of the parameter X and the parameter Y. That is, the measurement quality index outputter 205 can output the effective region of the design space in the enlarged manner by cutting off at least part of the region other than the design space in the distribution region of the measurement quality index data MQ. Thus, it is possible to provide the user with information useful for optimization of analysis conditions in the liquid chromatograph 3. The user can observe in detail a region that is effective for consideration of the analysis conditions in the measurement quality index display area 240.

Also, in the measurement quality index display area 240 shown in FIG. 10, a region where the measurement quality index data MQ has a high rate of change is displayed in an enlarged manner as compared to a region where the measurement quality index data MQ has a low rate of change. In the measurement quality index display area 240 shown in FIG. 9, the parameter X is displayed with equal spacing in a range of 0 to 10, and the parameter Y is displayed with equal spacing in a range of 0 to 100. In contrast, in the measurement quality index display area 240 shown in FIG. 10, the parameter X is displayed with larger spacing in a range of 5 to 6 and in a range of 8 to 9, and is displayed with smaller spacing in a range of 7 to 8. Meanwhile, the parameter Y is displayed with the largest spacing in a range of 70 to 80, and is displayed with the smallest spacing in a range of 50 to 70. In other words, in FIG. 10, the spacing of the parameters is displayed in the enlarged manner in a region where the spacing between each of boundaries 242, 243, 244 indicating the regions of the design spaces of 50, 80, 90 percentiles, respectively, is smaller in FIG. 9. That is, a region with a large change in the resolution data RD being the measurement quality index data MQ relative to a change in the parameters X, Y is displayed in more detail. This makes it possible for the user to analyze in more detail the analysis conditions of the region with the large change in the resolution data RD relative to the change in the parameters.

(5) Correspondence Between Constituent Elements in Claims and Parts in Preferred Embodiments In the following paragraphs, non-limiting examples of correspondences between various elements recited in the claims below and those described above with respect to various preferred embodiments of the present disclosure are explained. In the above-described embodiment, the chromatograph 3 is an example of an analysis device or a chromatograph. In the above-described embodiment, the computer 1 is an example of an analysis assistance device.

As each of various elements recited in the claims, various other elements having configurations or functions described in the claims can be also used.

(6) Other Embodiments

The chromatograph 3 has been explained as the analysis device of the present invention in the above-described embodiment. The present invention is also applicable to a gas chromatograph. Furthermore, the description has been made on the case where the computer 1 being the analysis assistance device of the present embodiment is connected to the liquid chromatograph 3 being the analysis device via the network 4 as an example in the above-described embodiment. As another embodiment, a configuration in which the computer 1 is incorporated in the analysis device may be applied.

In the above-described embodiment, the description has been made on the case where the analysis assistance program P1 is stored in the storage device 106 as an example. As another embodiment, the analysis assistance program P1 may be provided to be stored in the storage medium 109. The CPU 101 may access the storage medium 109 via the device interface 108 so that the analysis assistance program P1 stored in the storage medium 109 be stored in the storage device 106 or the ROM 103. Alternatively, the CPU 101 may access the storage medium 109 via the device interface 108 to execute the analysis assistance program P1 stored in the storage medium 109.

The specific configuration of the present invention is not limited to the above-described embodiments. Various variations and modifications are available without departing from the scope of the present invention.

(7) Aspects

The above-mentioned plurality of exemplary embodiments are understood as specific examples of the below-mentioned aspects by those skilled in the art.

(Item 1)

An analysis assistance device according to one aspect includes:
  an estimator that estimates distribution of measurement quality index data using a plurality of analysis condition data to be provided to an analysis device and a plurality of measurement data obtained in the analysis device based on the plurality of analysis condition data; and
  a measurement quality index outputter that outputs for display a region where the measurement quality index data is not less than a predetermined threshold value as a design space, and
  the measurement quality index outputter outputs the region of the design space in an enlarged manner by cutting off at least part of a region other than the design space in a distribution region of the measurement quality index data.

A user can be provided with information useful for optimization of an analysis condition in the analysis device. The user can observe in detail a region that is effective for consideration of the analysis condition by reference to the design space displayed by the measurement quality index outputter.

(Item 2)

In the analysis assistance device according to the item 1, the measurement quality index outputter may output a region where the measurement quality index data has a high rate of change in an enlarged manner as compared to a region where the measurement quality index data has a low rate of change in the displayed region of the design space.

The user can analyze the analysis condition in more detail as to a region with a large change in the measurement quality index data relative to a change in the analysis condition data.

(Item 3)

In the analysis assistance device according to the item 1 or 2,
  the analysis device may include a chromatograph, and
  the measurement quality index data may include resolution data of each component analyzed in the chromatograph.

It is possible to provide the information useful for optimization of the analysis condition in the chromatograph.

(Item 4)

An analysis assistance method according to another aspect includes:
  estimating distribution of measurement quality index data using a plurality of analysis condition data to be provided to an analysis device and a plurality of measurement data obtained in the analysis device based on the plurality of analysis condition data; and
  outputting for display a region where the measurement quality index data is not less than a predetermined threshold value as a design space, and
  the outputting outputs the region of the design space in an enlarged manner by cutting off at least part of a region other than the design space in a distribution region of the measurement quality index data.

(Item 5)

A non-transitory computer readable storage medium according to another aspect records an analysis assistance program that causes a computer to execute:
  processing of estimating distribution of measurement quality index data using a plurality of analysis condition data to be provided to an analysis device and a plurality of measurement data obtained in the analysis device based on the plurality of analysis condition data; and
  processing of outputting for display a region where the measurement quality index data is not less than a predetermined threshold value as a design space, and cutting off at least part of a region other than the design space in a distribution region of the measurement quality index data to output the region of the design space in an enlarged manner.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

I claim:

1. An analysis assistance device for searching for an optimal analysis condition for use with a liquid chromatography system, the device comprising a processor configured to:
  receive a plurality of analysis conditions, wherein each of the plurality of analysis conditions includes values for a plurality of analysis parameters;
  obtain a measurement data set comprising measurement data from the liquid chromatography system for each of the plurality of analysis conditions;

calculate a measurement quality data set comprising measurement quality data for each of the measurement data of the obtained measurement data set;

estimate as distribution data a distribution of the calculated measurement quality data set relative to the plurality of analysis parameters; and display as a design space a region of the distribution data where the measurement quality data is greater than or equal to a predetermined threshold value, wherein:

the design space includes a plurality of boundaries and the plurality of analysis parameters as axes, and the design space is displayed such that when the design space includes a change in the measurement quality data that is larger than a change in the plurality of analysis parameters:

the region is enlarged as an enlargement region; and the enlargement region is based on a spacing between each of boundaries, such that a small spacing between each of the boundaries compared to each spacing of an other area along a direction of an axis of the design space results in a large spacing in the enlargement region by cutting off at least part of the enlarged area in the design space of the measurement quality data.

2. The analysis assistance device according to claim 1, wherein the processor is further configured to output a region of the distribution data where the measurement quality data has a high rate of change in an enlarged manner as compared to a region of the distribution data where the measurement quality data has a low rate of change.

3. The analysis assistance device according to claim 1, wherein the measurement quality data includes resolution data of each component analyzed in the liquid chromatography system.

4. An analysis assistance method performed by a processor for searching for an optimal analysis condition for use with a liquid chromatography system, the method comprising:

receiving by the processor a plurality of analysis conditions, wherein each of the plurality of analysis conditions includes values for a plurality of analysis parameters;

obtaining by the processor a measurement data set comprising measurement data from the liquid chromatography system for each of the plurality of analysis conditions;

calculating with the processor a measurement quality data set comprising measurement quality data for each of the measurement data of the obtained measurement data set;

estimating with the processor as distribution data a distribution of the calculated measurement quality data set relative to the plurality of analysis parameters; and display as a design space a region of the distribution data where the measurement quality index data is greater than or equal to a predetermined threshold value, wherein:

the design space includes a plurality of boundaries and the plurality of analysis parameters as axes, and the design space is displayed such that when the design space includes a change in the measurement quality data that is larger than a change in the plurality of analysis parameters:

the region is enlarged as an enlargement region; and the enlargement region is based on a spacing between each of boundaries, such that a small spacing between each of the boundaries compared to each spacing of an other area along a direction of an axis of the design space results in a large spacing in the enlargement region by cutting off at least part of the enlarged area in the design space of the measurement quality index data.

5. A non-transitory computer readable storage medium recording an analysis assistance program for searching for an optimal analysis condition for use with a liquid chromatography system that when executed by a processor causes the processor to:

receive a plurality of analysis conditions, wherein each of the plurality of analysis conditions includes values for a plurality of analysis parameters;

obtain a measurement data set comprising measurement data from the liquid chromatography system for each of the plurality of analysis conditions;

calculate a measurement quality data set comprising measurement quality data for each of the measurement data of the obtained measurement data set;

estimate as distribution data a distribution of the calculated measurement quality data set relative to the plurality of analysis parameters; and display as a design space a region of the distribution data where the measurement quality data is greater than or equal to a predetermined threshold value, wherein:

the design space includes a plurality of boundaries and the plurality of analysis parameters as axes, and the design space is displayed such that when the design space includes a change in the measurement quality data that is larger than a change in the plurality of analysis parameters:

the region is enlarged as an enlargement region; and the enlargement region is based on a spacing between each of boundaries, such that a small spacing between each of the boundaries compared to each spacing of an other area along a direction of an axis of design space results in spacing in the enlargement region by cutting off at least part of the enlarged area in the design space of the measurement quality data.

* * * * *